May 24, 1938. J. H. COX 2,118,294
FLUID DISPENSING APPARATUS
Filed April 1, 1936 2 Sheets-Sheet 2
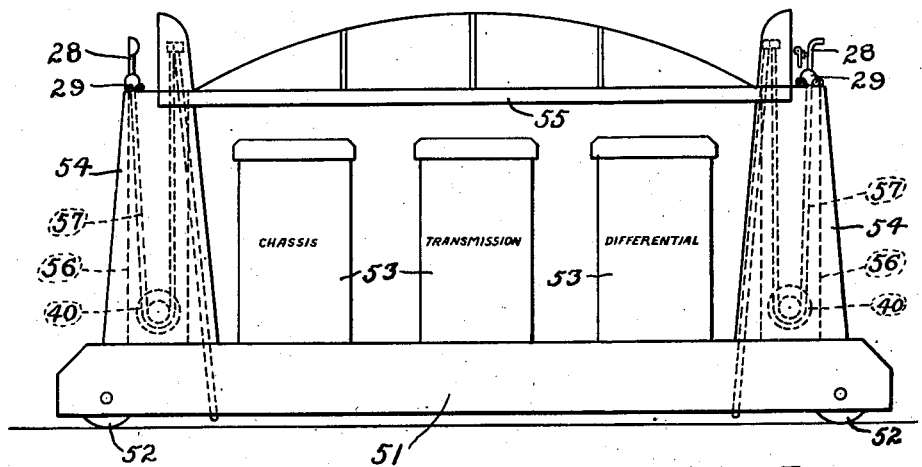
FIG. 7.
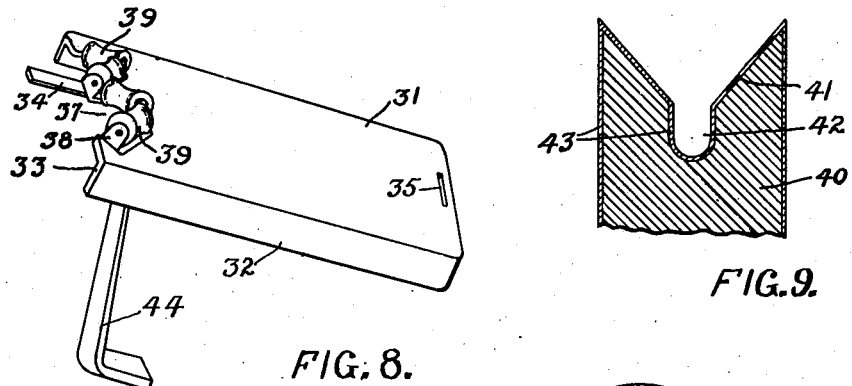
FIG. 8.
FIG. 9.
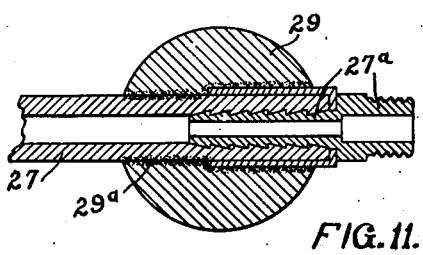
FIG. 11.
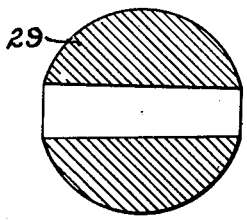
FIG. 10
INVENTOR
JAMES H. COX
BY
ATTORNEY Patented May 24, 1938

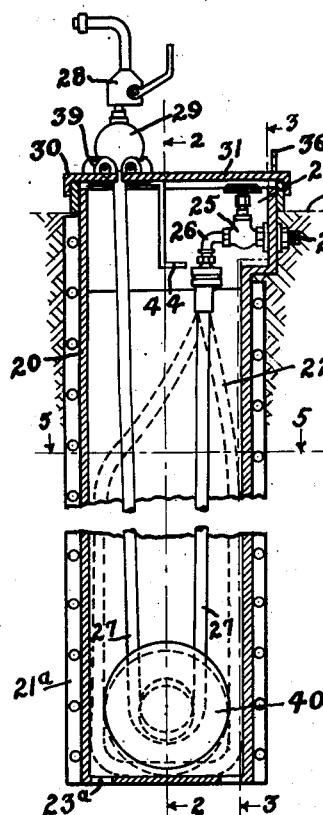
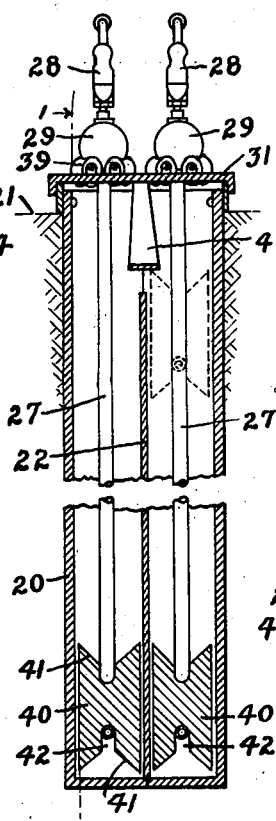
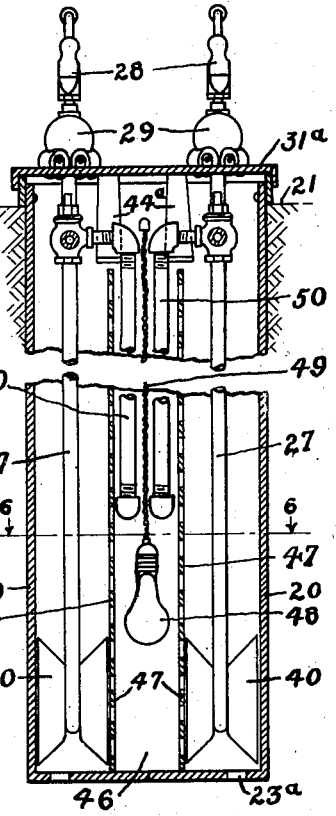
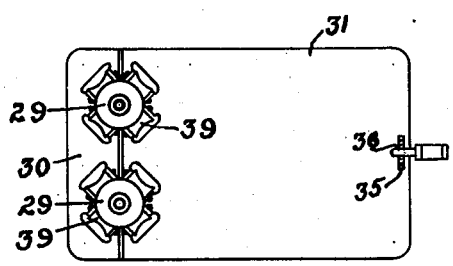
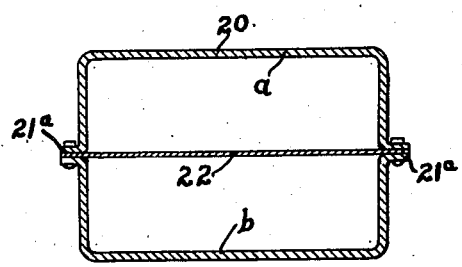
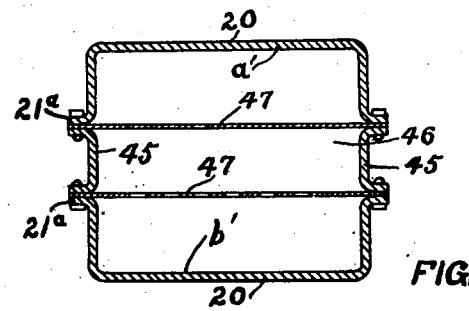

2,118,294

UNITED STATES PATENT OFFICE 2,118,294

FLUID DISPENSING APPARATUS

James H. Cox, Los Angeles, Calif., assignor of one-half to Daniel W. Cox, Los Angeles, Calif.

Application April 1, 1936, Serial No. 72,096

14 Claims. (Cl. 299—77)

This invention relates to dispensers for fluids; such, for example, as are used in and about service stations for automotive vehicles. As shown and herein described, it is used primarily for dispensing water and air. It is to be understood, however, that it is adaptable for dispensing other fluids and for use in places other than service stations.

On or about March 4, 1935, I filed application No. 9,189 for a patent covering an apparatus for the same general purpose. Subsequently, I made some changes in that apparatus which changes are embodied in the present invention. As respects the subject matter that is common to these applications, the present case may be considered a continuation in part of the said earlier application, although the latter has now become abandoned.

The principal objects of the invention are the provision of a dispensing apparatus which shall be economical in manufacture and reliable in use; which shall not be subjected to excessive wear and will be durable; which will not permit abrasion of the dispensing hose against the guides or the kinking of the hose; which is capable of ready dismantling if such should become necessary or desirable; which maintains the dispensing end of each hose in accessible position ready to be grasped for drawing out the hose-pipes; which keeps the hose-pipes taut and automatically returns them to normal position after use; which provides an underground guide or well, preferably rectangular or non-circular in transverse cross section into which the hose is retracted after use; which provides a closure for the upper end of the well or guide with anti-friction rollers associated therewith for guiding the hose pipes as they are moved in and out of the well; which maintains the service pipes for the hose underground to prevent freezing of the fluid and provides means within the well or guide for maintaining a temperature there above the freezing point. These and additional advantages and objects will be more fully set forth in the following specification.

While it is necessary to show and describe a certain specific structure which embodies my invention in its preferred form, it is to be understood that details may be modified without departure from the spirit of the invention and that the claims herein presented are not intended to be limited to the details shown and described any farther than is required by the terms employed therein.

In the drawings, Fig. 1 is a vertical sectional view on the line 1—1 of Fig. 2; Fig. 2 is a similar view on the line 2—2 of Fig. 1; Fig. 3 is a similar view as on the line 3—3 of Fig. 1 but showing a modified structure and illustrating a means for maintaining the temperature within the well above the freezing point; Fig. 4 is a plan view showing the upper face of the cover, the dispensing valves being removed; Fig. 5 is a transverse or horizontal section taken on the line 5—5 of Fig. 1; Fig. 6 is a similar view on the line 6—6 of Fig. 3; Fig. 7 is a side elevation of a modified structure embodying my invention; Fig. 8 is an isometric view of the removable part of the cover; Fig. 9 is a fragmentary sectional view taken diametrically through one of the sheaves; Fig. 10 is a sectional view taken centrally through one of the balls for supporting the dispensing pipes; and Fig. 11 is a sectional view taken longitudinally through the outer end of one of the dispensing pipes.

Taking up a description of the invention by reference to the drawings, omitting for the present the modification shown in Fig. 7, 20 is a casing or well which is usually embedded in the ground, standing vertically therein with the ground level at 21. Since it is intended to form a housing for the dispensing hose when the latter is suspended therein from its ends with but a single loop, as will be shown, the casing has a length which approximates one-half the length of the hose; and the latter will be long enough to reach the radiators, tires or other devices to be served. Transversely, the casing is preferably rectangular, as shown. In its simpler form, as shown in Figs. 1 and 5, it is made up of two channel-shaped, side members, a and b, each of which has outwardly-turned flanges 21a on its longitudinal edges. When these two members are assembled, as in Fig. 5, they provide a long, rectangular chamber which is substantially closed at one end and open at the other end. For a reason hereinafter set forth, the casing or well is divided centrally and longitudinally by a partition plate 22 which extends from the closed end of the casing to approximately the open end, as seen in Fig. 2. This plate has its lateral edges between the flanges 21a, and the flanges and plate are fixedly attached together, as by welding or riveting or both. At and adjacent its open end the casing is widened at one side to provide a housing 23. To prevent the accumulation of water within the casing, the bottom thereof is provided with drain apertures, as indicated at 23a.

Extending through and attached to the wall of the said housing are the supply pipes for the fluids which are to be dispensed, one of said pipes being shown at 24. Within the housing, each of said pipes is provided with a control valve 25. Attached to the inner sides of the valves are downturned elbows 26 to which are secured the stationary ends of the flexible dispensing pipes 27. The partition plate 22 divides the casing or well into two parallel chambers and the dispensing pipes are in these respective chambers, as in Fig. 2. Transversely of the casing, the chambers extend the entire width of the interior of the casing. Their width, however, is approximately half that of the casing. The chambers are, therefore, relatively long and narrow in transverse cross section, with parallel sides. This is important, as will be shown. The dispensing pipes may be of any suitable material, and preferably are rubber hose. They are long enough to reach from the couplings at the elbows 26 approximately to the closed end of the casing, to loop and then to reach and pass out of the upper end of the casing, each being provided on its free end with a dispensing cock 28 suitable for the particular fluid it is to control. Adjacent the cocks 28 the pipes pass through retaining or supporting members 29 which, as shown and preferred, are in the shape of balls. When the dispensing pipes are of rubber or when they have a rubber exterior coating, the balls are preferably of rubber for the reason that they can then be expeditiously and easily attached to their respective pipes. This is preferably accomplished by providing each ball with a diametral opening or bore (Fig. 10) into which the end of the pipe with its attaching member 27ª for its dispensing cock is forced. Prior to thus applying the balls, however, the ends of the pipes or balls, or preferably both the ends and the balls, are dipped into or otherwise coated with gasoline or some other suitable solvent of rubber to soften the rubber at the surface. Then, when the pipes are inserted into the balls, as shown in Fig. 11, and the films of softened rubber harden or set, the balls are securely attached. The said films are indicated at 29ª. To facilitate the entrance of the pipe ends into the bores in the balls, the walls of the bores may be, and preferably are, slightly tapered, as in Fig. 10.

To close the upper end of the casing against the entrance of dirt, snow and the like, I provide a lid or cover which cover serves further as a means of support for the delivery pipes 27. Preferably, the cover is made in two parts, as shown particularly in Fig. 4. At one end there is a relatively narrow part 30 which has a marginal flange that fits about the outer walls of the casing to which it is fixedly secured, as by rivets or spot welding. The part 31, covers the remaining part of the casing end, that part also having a marginal flange. It is not secured to the casing, however, except as is hereinafter described. In Fig. 8 this part is shown in an isometric view. The marginal flange 32 fits about the end of the casing, while the unflanged end, 33, abuts against the fixed part 30. The end 33 is held down by one or more members 34 on its under side which project beneath the fixed part 30. The opposite end of the part 31 is provided with a slot 35 through which a staple 36 projects when the cover is in position, the staple being adapted to receive a suitable pin or pad-lock to hold the cover closed. In closing the casing, the part 31 is placed over the open end of the casing with the flange 32 on the outside and the member 34 projected part way beneath the stationary part 30 of the cover. When in that position the movable part 31 rests upon the staple 36. By then sliding the latter part toward 30, the staple enters the slot 35 and the cover drops into position.

The casing and the cover are formed of relatively thick sheet metal, the parts being diepressed to the forms shown. At their abutting edges, the cover parts 30 and 31 are provided with registering V-shaped notches 37 which are centrally positioned over the respective chambers of the casing to form apertures through which the dispensing pipes may extend. At the converging edges of these notches the metal is so slotted and stamped as to form pairs of up-standing ears or lugs 38 which support the pivot pins for rollers 39. As best seen in Fig. 4, there are four of these rollers spaced equidistantly about each of said apertures, their axes being at right angles to one another and at 45° with respect to the marginal edges of the cover. The peripheral surfaces of the rollers are concaved, the better to guide the dispensing pipes as they are moved in and out through the apertures. When in normal position, as in Figs. 1 and 2, the balls 29 rest upon their respective sets of rollers. In use, it is seldom that the dispensing pipes are pulled out at right angles to the sides of the casing and the diagonal arrangement of the rollers is best adapted for guiding the pipes.

For holding the pipes 27 taut at all times, I provide weights at the loops thereof. These weights are in the form of sheaves 40. Since these sheaves are an important feature of the invention, they will be described with some particularity. They are, of course, heavy enough to retract their respective pipes when the latter are freed after use. They may be made of any suitable material, cast iron being preferred because of its cheapness. They are narrower than the well chambers in which they move so as to be guided by the side walls of the chambers but prevented from twisting about horizontally and kinking their respective pipes 27. Their peripheral surfaces are provided with a V-shaped groove, the side walls 41 of which are at an angle of approximately 45° with respect to the corresponding end of the sheave. At the apex of this groove is a channel 42 having a width but little greater than the diameter of the pipe 27 within it and a depth considerably greater than said diameter of the pipe. The bottom of this channel is rounded to fit the pipe, and the side walls are substantially parallel. In the frequent use of the pipes it is almost inevitable that they will twist axially. If the periphery of the sheave were not grooved or were but slightly concaved, this twisting of the pipe would cause the loop to run diagonally about the sheave and the pipe to scrape the walls of the casing chamber, thus wearing the pipe. In the structure shown the pipe cannot run diagonally and contact the walls of the casing. The center of gravity of the sheave being above the loop, the sloping walls 41 of the sheave cause the pipe to enter the channel 42 and the parallel side walls of the channel prevent the pipe from running diagonally. To minimize wear of the pipe and other parts of the apparatus and to prevent rust the sheaves are preferably coated with enamel or some similar substance, as shown at 43 in Fig. 9. The extreme diameter of the sheave is less than the horizontal length of the chamber within which it operates by an amount which is, at least, as great as the diameter of the dispensing pipe 27. That makes it impossible for the pipe to jam between the sheave and the casing wall. The sheave can swing slightly to the right and left, as shown in Fig. 1 and if the pipe were, for some reason, to leave the channel and groove of the sheave and get caught between the latter and the casing wall, the sheave would simply swing from that wall and the pipe would be released without damage.

If, in pulling out a pipe 27, its sheave 40 could be lifted until it contacted with the cover 30—31, the pipe would be bent so abruptly at and about the coupling with the elbow 26 as eventually to result in rupture or leakage of the pipe. To prevent such excessive movement of the sheave, I attach to the part 31 of the cover a stop member 44 which is so positioned as to be engaged by the sheave to arrest its movement before such abrupt bending of the pipe can take place. This stop may be, and preferably is, integral with the member 34, hereinbefore described. As shown in Fig. 2, the stop is centrally positioned over the partition and projects far enough on both sides to arrest either or both sheaves.

The reason for placing the controlling valves 25 in the housing 23 will now be explained. If the housing were not provided, the valves would have to be in the well or casing proper, where they would interfere with the sheaves 40 in case it became necessary to dismantle the apparatus, as for changing the dispensing pipes 27. With the valves set back into the housing, it is possible, after the cover part 31 has been removed, to raise the sheave by pulling on the pipe until the sheave can be grasped by hand. Then it can be lifted out of the casing without interference from the corresponding valve, the deep groove in the sheave permitting the latter to pass the elbow 26 and pipe coupling. Thereafter, the pipe can be uncoupled and removed.

Figs. 3 and 6 show a modified form of the apparatus. In them, the reference characters heretofore used will be employed as far as applicable. The casing members a' and b' are the same as the corresponding members a and b except that the parts forming the bottom of the casing are somewhat extended to abut at the center. Between the flanges 21ª of these members is a pair of intermediate members 45 which extend vertically from top to bottom of the casing, thereby separating the sheave chambers and providing a third chamber 46. The members 45 are each provided with edge flanges like the flanges 21ª, and partition plates 47 are secured between the opposing flanges, as shown in Fig. 6. The plates 47 are like the partition plate 22 except that they are perforated throughout substantially their entire areas. The interposition of the space 46 between the sheave chambers necessitates a more extended cover plate 31ª and a pair of stops 44ª for the respective sheaves 40.

Within the chamber 46 is a heater for maintaining the temperature above the freezing point. Preferably, this heater is of the electric type and is shown as an incandescent electric lamp 48, the current for which is supplied from some suitable source and is led to the lamp through conductors 49 within the heating chamber 46. The warmed air rises from the lamp and spreads laterally over and through the perforated plates 47 and descends in the sheave chambers, thus surrounding the dispensing pipes 27 and preventing the fluid therein from freezing during very cold weather. The best effect is secured by placing the heater in the lower part of the heating chamber and by introducing the fluids near the heater. The service pipes 50 are then extended upwardly within the said chamber where they are surrounded by the current of warm air rising from the heater. As will be understood, this type of apparatus is designed for use in very cold regions.

The types of apparatus that have been described find their principal uses at service stations for automotive vehicles for dispensing water and air. They are usually placed in the so-called "island" of such stations, the casings being substantially buried in the ground and the cover just above the ground level as indicated. The casings, therefore, form not only guides for the sheaves but retaining walls for holding the surrounding earth. Then when installed, they are stationary. In Fig. 7 I have shown a modified form which is all above ground and capable of movement from place to place. In the service stations referred to, it is a common practice to position containers for and dispensers of various kinds or grades of oil on a sort of carriage which can be moved about. In Fig. 7 such a carriage is shown, the main body being indicated at 51, the ground wheels at 52 and a plurality of oil containers at 53. The body 51 may be made of any suitable material. At each end of the carriage is an upright pedestal or column 54, the same being connected by a bridge-like structure 55 upon which various tools for use about the station may be placed for convenient access. Within each of the pedestals is a casing or guide like or similar to that shown at 20 in Figs. 1 and 2, the same appearing in dotted lines at 56. Within the casings are the looped dispensing pipes 57 having the dispensing cocks 28 and the balls 29. The pipes are kept taut by the sheaves, outlined at 40. In fact, the structure of the casings and the dispensing elements are the same as have been described except that they are mounted within the pedestals instead of being beneath the ground. Therefore, further illustration and description are deemed unnecessary. The service supply pipes 58 are above ground and are, of course, long enough to permit the carriage to be moved about as may be required when in use.

When the apparatus is not in use, as when the station is closed for the night, the cover 31 or 31ª is moved and the outer ends of the dispensing pipes with their cocks 28 are dropped within the casing, the sheaves then resting upon the bottoms of the casing and the pipes taking a shape such as is indicated in dotted lines in Fig. 1. The cover is then replaced and secured in position.

Having thus described my invention, I claim:

1. A device of the character described comprising an elongated casing, said casing being substantially rectangular in transverse cross section and defining an elongated, rectangularly-shaped chamber, a flexible dispensing pipe attached to a source of fluid supply adjacent the top end of said casing and extending from its point of attachment downwardly approximately to the lower end of the chamber, then doubling back to provide a loop and then rising within and passing out of the chamber, a mobile weight supported by said dispensing pipe within the loop thereof, said weight being in the form of a sheave, the perimeter of the sheave having a V-shaped groove, the faces of the V intersecting the side walls of the sheave, said sheave also having a channel at the apex of the V-shaped groove, said channel having a diameter approximately the same as the diameter of the dispensing pipe and a depth at least as great as the diameter of the said pipe, the width of the casing being sufficient to prevent binding of the sheave but insufficient to permit turning of the latter transversely of its side walls.

2. A device as set forth in claim 1 in which the said channel is provided with substantially parallel side walls against which the said pipe is adapted to engage and be held centrally of the sheave and out of contact with the walls of the chamber.

3. In a device of the character described, an elongated casing disposed in upright position and, except for its upper end, buried beneath the ground, a cover for the said upper end, said cover being in two parts, one of which parts is rigidly fixed to the casing and the other part removable from the casing and substantially abutting the fixed part, both of said parts being notched at their abutting edges and the notches registering to provide a pair of apertures in the cover, means for attaching the removable part to the casing, a group of rollers spaced about each of said apertures, the axes of said rollers being obliquely disposed with respect to the abutting edges of the cover-parts, a partition plate secured within the casing and dividing it longitudinally into two parallel chambers, said chambers being substantially rectangular in transverse cross-section, a fluid-dispensing pipe within each of said chambers, each of said pipes being fixed at one end and looped downwardly within its respective chamber, thence rising from the loop and passing through the respective aperture in the cover, means on the outer end of each pipe cooperating with the respective group of rollers to hold the pipe in suspended position, and a sheave for and supported by each of said pipes, said sheaves being within their respective loops and each of the sheaves being provided with a peripheral V-shaped groove, the V-faces of the groove intersecting the side walls of the respective sheave and the side walls of the sheave contacting the side walls of the respective chamber when said sheave is turned transversely of its side walls, whereby the dispensing pipe is guided away from the side walls of the chamber, the sheave being further provided with a channel at the apex of the V-shaped groove into which channel the said pipe is guided.

4. A device as set forth in claim 3 in which the removable part of the cover is provided with a downwardly-turned marginal flange at all of its edges except that edge which is notched and which abuts against the fixed cover part, said flange being adapted to fit the corresponding outer faces of the casing when the said removable part is in closed position, a member attached to the underside of said removable part and projected therefrom beyond the notched edge, said member engaging beneath the fixed part of the cover when the removable part thereof is in closed position, and cooperating means on the casing and on the removable part of the cover adjacent its edge which is opposite the said notched edge for holding the said removable part in closed position.

5. A device as set forth in claim 3 in which each of the sheaves is provided with a coating of a smooth non-abrasive material to prevent wear of the pipe due to its contact with the sheave.

6. A device as set forth in claim 3 having means projected into each of the chambers and into the paths of travel of the sheaves for engagement with the sheaves to arrest their upward movements.

7. A device as set forth in claim 3 having means attached to the removable part of the cover and projected downwardly into the chambers and into the paths of travel of the sheaves for engagement with the sheaves to arrest their upward movement and prevent them from engagement with the closed cover when the respective pipes are drawn out from the casing for dispensing a fluid.

8. A device as set forth in claim 3 in which the removable part of the cover has a member attached thereto and projected at one of its ends beyond the notched edge of said part to engage beneath the fixed part of the cover and projected at its opposite end into the paths of travel of the said sheaves to arrest their upward movement and prevent their engagement with the closed cover when the respective pipes are drawn out from the casing in dispensing a fluid.

9. In a device of the character described, a rectangular casing, chamber-defining partitions in said casing, an electric heater in at least one of said chambers, said partitions being provided with perforations, flexible fluid-dispensing means adapted to be extended from and retracted within said casing, weighted sheave means for holding said flexible means taut as it is extended from or retracted within said casing, a closure for said casing, and means on said closure for supporting said flexible means.

10. A device as set forth in claim 9 in which the partitions divide the space within the casing into three chambers and in which the heater is in the middle chamber and the dispensing means are within the other chambers.

11. In an apparatus for dispensing fluids, an elongated casing buried upright beneath the ground with only its upper end above the ground level, a perforated partition plate within the casing dividing the space therein into chambers, a cover for the upper end of the casing, a flexible fluid-dispensing pipe looped within one of said chambers, and means within another chamber for heating the interior of the casing and causing the air therein to circulate about said dispensing pipe to prevent the fluid from freezing therein.

12. In a device of the character described, a flexible rubber-covered dispensing pipe, means for attaching a valve inserted into the end of said pipe, a metallic sleeve surrounding the said end of the pipe about the inserted means, a diametrically-apertured rubber ball surrounding said pipe and bearing upon both the pipe and the sleeve, and a film of rubber within the aperture of the ball and about the pipe and sleeve, said film cementing the pipe and ball together.

13. A device of the character described comprising an elongated casing, the same being substantially rectangular in transverse cross section and defining an elongated, rectangularly-shaped chamber, a flexible dispensing pipe attached to a source of fluid supply adjacent the top end of said casing and extending from its point of attachment downwardly approximately to the lower end of the chamber, then doubling back to provide a loop and then rising within and passing out of the chamber, a mobile weight supported by said dispensing pipe within the loop thereof, said weight being in the form of a sheave, the perimeter of the sheave being provided with a groove adapted to receive said flexible pipe, the width of said groove near its bottom being slightly greater than the diameter of the dispensing pipe and the depth of said groove being at least as great as the diameter of said pipe, the sides of said groove diverging outwardly and intersecting the walls of said weight to form peripheral edges, said edges being of less thickness than the radius of said pipe, and the width of said casing being sufficient to prevent binding of the sheave but insufficient to permit complete turning of the latter transversely of the side walls of the casing.

14. In a device of the character described, an elongated casing comprising a pair of channel-shaped side members having an outwardly turned flange at each side of each member, the said side members being assembled with their channels facing to form an elongated space between the members, the said flanges being in pairs at each side of said space and the flanges in each pair being in parallel relation and slightly separated, a partition plate dividing the said space longitudinally and having its marginal edges between the respective pairs of flanges, means for securing the flanges and the partition plates together at various points along the length of the flanges to form a rigid, box-like casing with parallel chambers therein, the side walls of said chambers being substantially parallel and each chamber being substantially rectangular in transverse cross-section, a fluid dispensing pipe for and within each of said chambers, each of said pipes being fixedly secured at one of its ends to the casing, thence extending longitudinally of the chamber to approximately the lower end thereof, then looping and again extending longitudinally within the chamber and passing outwardly of the latter, means adapted to engage the free end of each of said pipes for suspending the looped pipes within their respective chambers, a sheave for and supported within the loop of each pipe, the perimeter of the sheave being provided with a groove adapted to receive the respective fluid dispensing pipe, the width of said groove near its bottom being slightly greater than the diameter of the dispensing pipe and the depth of said groove being at least as great as the diameter of said pipe, the sides of said groove diverging outwardly and intersecting the walls of said sheave to form peripheral edges, said edges being of less thickness than the radius of said pipe, and the width of the chambers within the casing being sufficient to prevent binding of the respective sheaves therein but insufficient to permit complete turning of the sheaves transversely of the side walls of the chambers.

JAMES H. COX.